(12) United States Patent
Csizmadia (10) Patent No.: US 8,430,570 B2
(45) Date of Patent: Apr. 30, 2013

(54) METHOD FOR PRODUCING A BEARING (75) Inventor: László Csizmadia, Györ (HU)

(73) Assignee: Audi AG, Ingolstadt (DE)

( * ) Notice: Subject to any disclaimer, the term of this patent is extended or adjusted under 35 U.S.C. 154(b) by 897 days.

(21) Appl. No.: 12/553,654

(22) Filed: Sep. 3, 2009

(65) Prior Publication Data
US 2010/0086245 A1 Apr. 8, 2010

(30) Foreign Application Priority Data

Sep. 5, 2008 (DE) .................. 10 2008 045 993

(51) Int. Cl.
F16C 17/00 (2006.01)
F16C 32/02 (2006.01)
F16C 9/03 (2006.01)

(52) U.S. Cl.
USPC ......... 384/129; 384/276; 384/294; 29/898.04

(58) Field of Classification Search .......... 384/129, 384/145, 268, 270, 272–273, 27, 288, 290, 384/294, 295, 429; 29/898.04, 898.054, 29/898.058
See application file for complete search history.

(56) References Cited

U.S. PATENT DOCUMENTS

| | | | | |
|---|---|---|---|---|
| 2,333,227 A | * | 11/1943 | Bagley, Jr. | 29/898.058 |
| 3,313,968 A | * | 4/1967 | Kaiser | 310/410 |
| 3,625,580 A | * | 12/1971 | DeHart et al. | 384/288 |
| 3,943,908 A | * | 3/1976 | Kubis et al. | 123/193.6 |
| 4,383,719 A | * | 5/1983 | Matzelle | 384/288 |
| 4,644,853 A | * | 2/1987 | Russell et al. | 384/273 |
| 5,232,342 A | * | 8/1993 | Thompson | 384/295 |
| 5,489,155 A | * | 2/1996 | Ide | 384/119 |
| 5,743,654 A | * | 4/1998 | Ide et al. | 384/311 |

FOREIGN PATENT DOCUMENTS

| | | |
|---|---|---|
| EP | 0909899 A2 | 4/1999 |
| JP | 06228523 A | 8/1994 |
| JP | 2001314906 A * | 11/2001 |

* cited by examiner

Primary Examiner — Marcus Charles
(74) Attorney, Agent, or Firm — Novak Druce Connolly Bove + Quigg (57) ABSTRACT The invention relates to a method for producing and/or assembling a bearing with a bearing bore, a journal which is located in the bearing bore and at least two bearing shells which at least partially encompass the journal in the bearing bore, there being a number n of tolerance classes. Here the bearing class width $C_1$ for the bearing bore and/or the journal should obey a relation $C_1 = T_1 = t_2 = T_3 = \ldots = t_n/T_n$, and another bearing class width $C_2$ for at least the first of the bearing shells and/or at least one other of the bearing shells should follow the relation $C_2 = t_1 = T_2 = t_3 = \ldots = T_n$, $T_i$ (with $i=1, \ldots, n$) being tolerance range values of the bearing bore and/or of the journal and $t_i$ (with $i=1, \ldots, n$) being tolerance range values of at least one first and/or at least one other bearing shell and that the bearing bore is assigned to one bearing shell and/or the journal is assigned to the other bearing shell such that there is the same bearing classification with $C_1 = C_2$ and/or an unlike bearing classification with $C_1 < C_2$ or $C_1 > C_2$, preferably $C_1 > C_2$. The invention furthermore relates to a bearing.

1 Claim, 6 Drawing Sheets

METHOD FOR PRODUCING A BEARING

BACKGROUND OF THE INVENTION (1) Field of the Invention

The invention relates to a method for producing and/or assembling a bearing with a bearing bore, a journal which is located in the bearing bore and at least two bearing shells which at least partially encompass the journal in the bearing bore, there being a number n of bearing classes with different tolerance. The invention furthermore relates to a bearing.

(2) Description of Related Art

Methods for producing and/or assembling a bearing are known from the prior art. Conventionally, shafts or journals are supported in bearing bores in which furthermore bearing shells are located. They provide, for example, for improved sliding of the shaft or of the journal in the bearing bore. Due to tolerances in the production of the bore, the journal and the bearing shells which add up in the assembly of the elements, dispersion of the so-called bearing play arises. The bearing play designates the difference between the diameter of the bearing bore minus the thickness of the bearing shells and the diameter of the journal. The bearing play must remain within mechanical limits in order to enable on the one hand proper sliding of the journal in the bearing bore and on the other hand to avoid excessive bearing play which could result in the journal being deflected. If the bearing play is excessive, impact excitations can occur which are acoustically adverse. For these reasons the bearing play must be greater than a minimum limit, but should be as small as possible to the top. It follows that the bearing play should have as little dispersion as possible. It is known, to classify the individual elements of the bearing, i.e., the bearing bore, journal and bearing shells in order to assign them each to a certain tolerance range. Depending on the classification, the elements are provided with color markings. If without classification the bearing play is in the range of 0.026 mm to 0.074 mm, the bearing play can be reduced to a range from 0.026 mm to 0.044 mm by using the method, in which classes of the housing and of the journal are connected by way of a matrix to classes of bearing shells.

EP 0 909 899 B1 describes a method for assembly of a slide bearing. Here values for a minimum play limit, a maximum play limit and values for measurement uncertainties are defined. After determining the actual measurements of pre-fabricated shafts, the deviation from an average bearing play which occurs in the pairing of the bearing bore with the shaft is determined. Then bearing shells are assigned such that the bearing play lies in a value range which exceeds the minimum play limit at least by the value of measurement uncertainty, but is below the maximum play limit. This method is, however, relatively complex in application.

BRIEF SUMMARY OF THE INVENTION

Conversely, the method for producing and/or assembling a bearing with the features provided in the invention has the advantage that the method can be applied very easily, i.e., does not entail a high degree of logistical effort, and at the same time enables a clear reduction of the dispersion of the bearing play. This is achieved by a bearing class width $C_1$ for the bearing bore and/or the journal obeying a relation $C_1 = T_1 = t_2 = T_3 = \ldots = t_n/T_n$ and another bearing class width $C_2$ for at least the first of the bearing shells and/or at least one other of the bearing shells obeying a relation $C_2 = t_1 = T_2 = t_3 = \ldots = T_n/t_n$, $T_i$ (with $i = 1, \ldots n$) being tolerance range values of the bearing bore and/or of the journal and $t_i$ (with $i=1, n$) being tolerance range values of at least one first and/or of at least other bearing shell and that the bearing bore is assigned to one bearing shell and/or the journal is assigned to the other bearing shell such that there is the same bearing classification with $C_1 = C_2$ and/or an unlike bearing classification with $C_1 < C_2$ or $C_1 > C_2$, preferably $C_1 > C_2$. The bearing bore is assigned at least the first of the bearing shells and the journal is assigned at least one other of the bearing shells. A number n of tolerance classes is assigned to the bearing bore and the first bearing shell and/or the journal and the other bearing shell. There can be a different number n of tolerance classes for the bearing bore/first bearing shell and journals/other bearing shell. For each tolerance class the tolerance range value $T_i$ of the bearing bore and/or of the journal and $t_i$ of the first and/or the other bearing shell are specified. The tolerance range values are linked to one another by way of the bearing class widths $C_1$ and $C_2$. For $C_1$ the relation $C_1 = T_1 = t_2 = T_3 = \ldots = t_n/T_n$ applies, the last term arising depending on whether there is an even or an odd number n of tolerance classes. The bearing class width $C_2$ obeys the relation $C_2 = t_1 = T_2 = t_3 = \ldots = T_n/t_n$. The indicated relations can of course be regarded as exemplary, i.e., less than three tolerance classes are also possible. The relations arise from conditions that the maximum value of a quantity $M_1$ or $M_2$ and the minimum value of a quantity $M_1$ or $M_2$ should be constant over all tolerance classes. This would yield conditions $T_n = t_{n-1}$ and $T_{n-1} = t_n$, i.e., for example, $T_2 = t_1$, $T_3 = t_2$ and $T_1 = t_2$, $T_2 = t_3$. In the production and/or assembly of the bearing at this point the first bearing shell is assigned to the bearing bore and/or the other bearing shell is assigned to the journal such that the bearing classification is the same, there $C_1 = C_2$ applies, and/or an unlike bearing classification, i.e., $C_1$ is not equal to $C_2$. For an unlike bearing classification $C_1 > C_2$ is preferred. For the same bearing classification it applies that elements assigned to one another have the same tolerance range values. Therefore $t_i = T_i = C$. Thus the total tolerances are also equal, i.e., $t = T$. The total tolerances result from the sum of the tolerance range values, i.e., $t = t_1 + t_2 + \ldots + t_n$ and $T = T_1 + T_2 + \ldots + T_n$. It follows from these definitions that the dispersion of the bearing play can be determined with relation $t_i + T_i = 2C = 2T/n$. For an unlike bearing classification it must be distinguished between the cases in which n is even or odd. If the number n of tolerance classes is even, this results in turn in that the total tolerance T and t are the same: $t = T = n/2 \, (C_1 + C_2)$. This yields the dispersion of the bearing play of $t_i + T_i = C_1 + C_2 = 2T/n$. Thus the dispersion for an unlike bearing classification for an even number of tolerance classes is the same as for the same bearing classification. For an odd number of tolerance classes the result is that the total tolerances T and t are unequal: $T = (n+1)/2 \cdot C_1 + (n-1)/2 \cdot C_2$ and $t = (n-1)/2 \cdot C_1 + (n+1)/2 \cdot C_2$. This yields the dispersion of the bearing play of $t_i + T_i = C_1 + C_2 = (T + t)/n$. In this case distinctly smaller dispersion can be achieved than for an unlike bearing classification for an even number of tolerance classes or for the same bearing classification. This means that for an even number of tolerance classes the same bearing classification can be used, the unlike bearing classification yielding the same results. Here the tolerance range values $T_i$ and $t_i$ can be the same, the total dispersion of the bearing play is $2T/n$. Of course, for the bearing bore and the journal there can be different tolerance range values $T_i$ and bearing class widths $C_1$. Likewise the tolerance range values $t_i$ of the first and other bearing shell as well as the other bearing class width $C_2$ can deviate from one another.

Another development of the invention calls for that for the same number of bearing classes the same bearing classification is used. The aforementioned conditions result in that the tolerance range values $T_i$ and $t_i$ are the same. Thus the dispersion of the bearing play is $t_i + T_i = 2T/n$, therefore is inversely proportional to the number n of tolerance classes. As described above, for an even number of tolerance classes for the same bearing classification and an unlike bearing classification the same dispersions are achieved.

A furtther development of the invention calls for that for an odd number of tolerance classes an unlike bearing classification is used. For an odd number of tolerance classes, with an unlike bearing classification a smaller dispersion of the bearing play can be achieved which is equal to $t_i+T_i=(T+t)/n$.

A still further development of the invention calls for a total tolerance $t=t_1+t_2+\ldots+t_n$ of one or the other bearing shell which results from the sum of tolerance range values $t_i$ to be chosen to be smaller than the total tolerance $T=T_1+T_2+\ldots+T_n$ of the bearing bore or of the journal which results from the sum of tolerance range values $T_i$. When $t<T$, $C_2<C_1$ also applies. In this case, with an unlike bearing classification very small dispersion of the bearing play can be achieved since $t_i+T_i=(T+t)/n<2T/n$ applies. The latter value is achieved with the same bearing classification or an unlike bearing classification when n is even.

Another development of the invention calls for the same bearing classification or the unlike bearing classification to be used for the bearing bore and the first bearing shell and for the journal and the other bearing shell. Thus, for all bearing elements either the same or the unlike bearing classification is to be used.

A further development of the invention calls for the same bearing classification to be used for the bearing bore and the first bearing shell and the unlike bearing classification to be used for the journal and the other bearing shell or the unlike bearing classification to be used for the bearing bore and the first bearing shell and the same bearing classification to be used for the journal and the other bearing shell. Thus it can also be provided that for some of the bearing elements the same bearing classification and for other elements the unlike bearing classification are used.

A still further development of the invention calls for the method at a given production tolerance to be used for minimization of the bearing play. If the production tolerances of the individual elements of the bearing are known, the method can be used to minimize the bearing play. For this purpose the elements, that is, the bearing bore, the journal and the bearing shells are divided among tolerance classes. The elements in the individual tolerance classes are combined with one another in the above described manner so that minimization of the bearing play results.

Another development of the invention calls for it to be used after specifying a desired bearing play for determining the allowed total tolerance in the production of the bearing bore, the journal and/or bearing shells. The method can therefore already be used in the planning stage of production of the bearing. In this connection, the desired bearing play or the desired dispersion of the bearing play is specified and the described method is used to determine the production tolerances of the individual components. In this way, for example, it can be possible to maintain the intended dispersion of the total tolerance, but to be able to provide larger tolerances in the production in the production of the bearing bore, of the journal and/or the bearing shells than with other methods.

A further development of the invention calls for the bearing bore to be provided in a cylindrical crankcase and/or the journal on the crankshaft and/or for the bearing to be a slide bearing. The method can therefore be used, for example, for fast and efficient production in the area of automotive engineering, in particular for producing an engine/an internal combustion engine.

A still further development of the invention calls for the bearing to be installed in an engine, in particular with increased acoustic requirements. If the dispersion of the bearing play in the bearings of an engine is reduced, i.e., improved, the engine can be produced, for example, more favorably or can become more efficient at the same costs. Based on the lower tolerances or smaller dispersion the elements of the engine can be better matched to one another, whereby the efficiency is increased and/or the acoustic properties are improved.

Another development of the invention calls for the first bearing shell to be used for tolerance equalization of the bearing bore and the other bearing shell to be used for tolerance equalization of the journal. Both the bearing shells and also the bearing bore and the journal are subject to certain tolerances in production. As much as possible, the resulting dispersion of the bearing play after assembly or production of the bearing is to be minimized. For this reason elements assigned to one another are used for mutual tolerance equalization. The first bearing shell is therefore used to equalize tolerances of the bearing bore and the other bearing shell is used to equalize tolerances of the journal.

The invention furthermore comprises a bearing, in particular produced and/or assembled using the method according to the preceding, with a bearing bore, a journal located in the bearing bore, and at least two bearing shells which at least partially encompass the journal in the bearing bore, there being a number n of tolerance classes. Here it is provided that a bearing class width $C_1$ for the bearing bore and/or journal obeys a relation $C_1=T_1=t_2=T_3=\ldots=t_n/T_n$ and another bearing class width $C_2$ for at least the first of the bearing shells and/or at least one other of the bearing shells obeys a relation $C_2=t_1=T_2=t_3=\ldots=T_n/t_n$, $T_i$ (with i=1, ... n) being tolerance range values of the bearing bore and/or of the journal and $t_i$ (with i=1, ... n) being tolerance range values of at least one first and/or of at least another bearing shell and that the bearing bore is assigned to one bearing shell and/or the journal is assigned to the other bearing shell such that there is same bearing classification with $C_1=C_2$ and/or an unlike bearing classification with $C_1<C_2$ or $C_1>C_2$, preferably $C_1>C_2$.

DETAILED DESCRIPTION OF THE INVENTION

Figure 1:
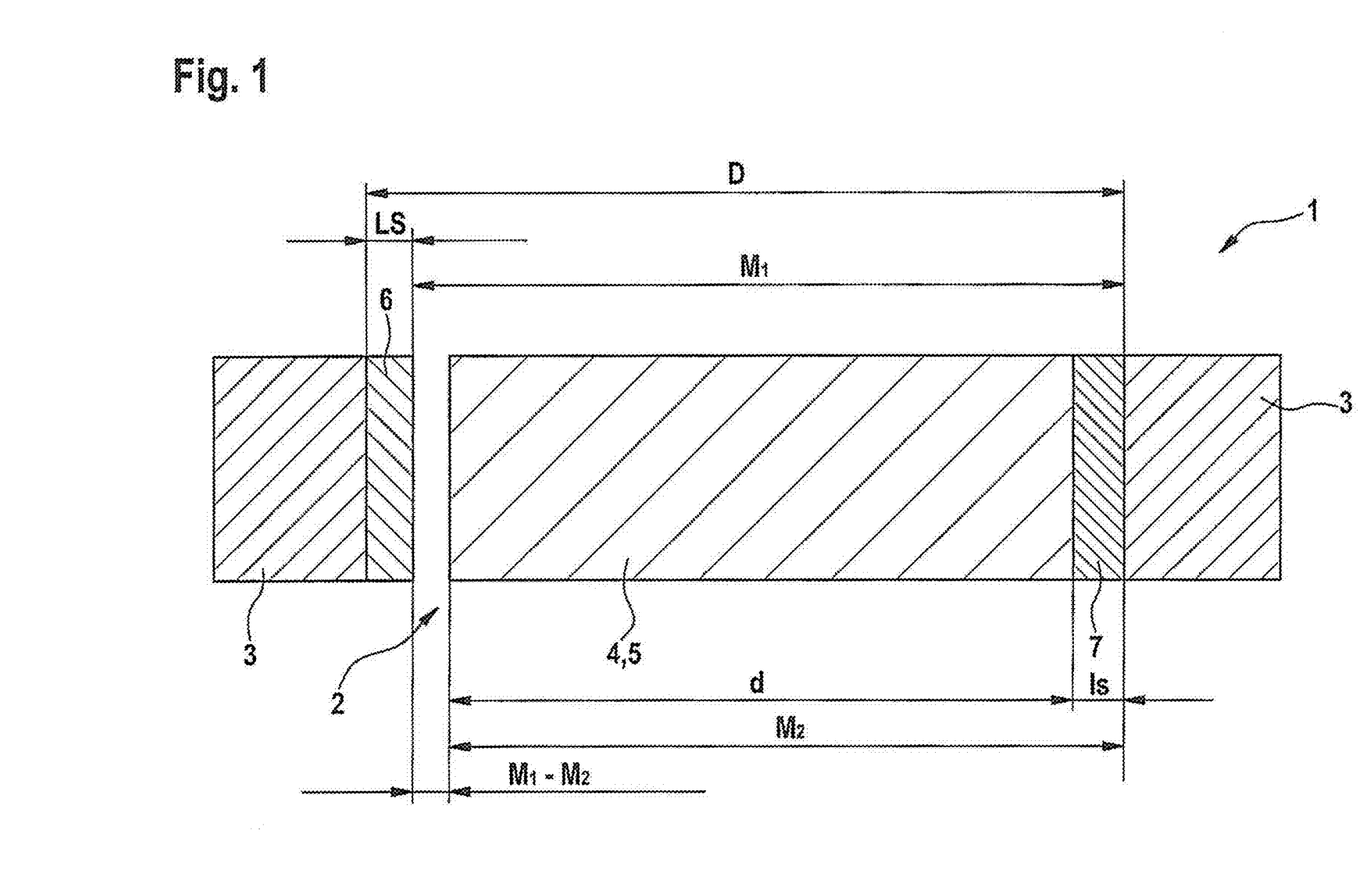
FIG. 1 shows a schematic of a bearing with a definition of the quantities required for determining the dispersion of the bearing play.

FIG. 1 shows a schematic of a bearing 1 with a definition of the quantities required for determination of the dispersion of the bearing play. The bearing 1 encompasses a bearing bore 2 in a cylinder crankcase 3. In the bearing bore 2 there is the journal 4 of a crankshaft 5, its being enclosed by an upper bearing shell 6 and a lower bearing shell 7. The upper bearing shell 6 and the lower bearing shell 7 are therefore located between the cylinder crankcase 3 and the journal 4 and are used in particular for reducing the friction between the cylinder crankcase 3 and the journal 4. The bearing bore 2 has a diameter D, while the journal 4 has a diameter d. The thickness of the upper bearing shell 6 is designated as LS and the thickness of the lower bearing shell 7 is designated as Is. Based on D, d, LS and Is, quantities $M_1$ and $M_2$ can be defined which result from the relations $M_1=D-LS$ and $M_2=d+Is$. The bearing play of the bearing 1 now follows from the relation $M_1-M_2$. Due to the tolerances in the production of the bearing bore 2, the journal 3 and the upper and lower bearing shells 6 and 7, there is dispersion of the bearing play. In order to ensure good running capacity of the bearing, the bearing play must always be larger than the minimum bearing play, while, to prevent bearing noise and damage to the bearing 1, the bearing play should not become excessive.

Figure 2:
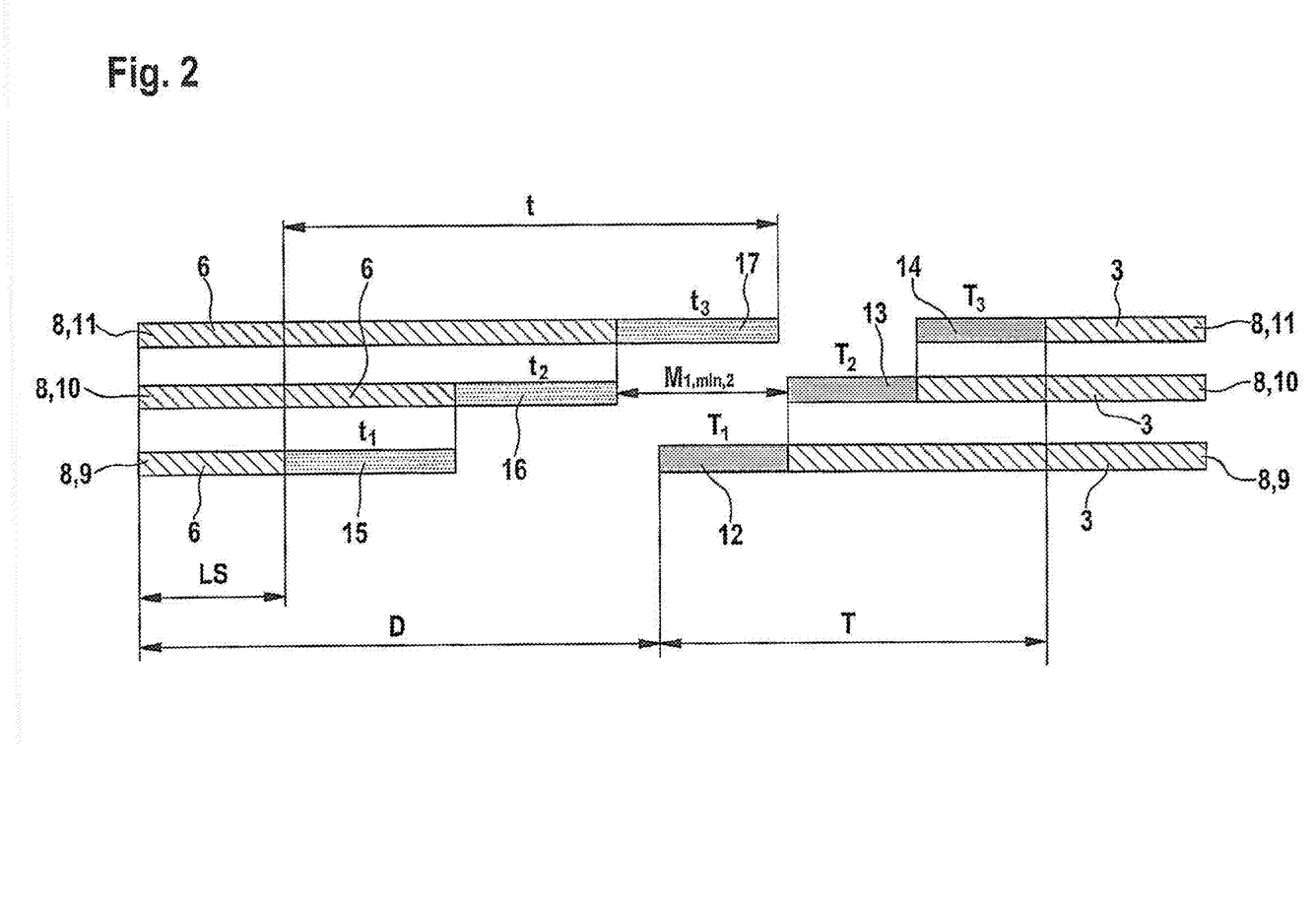
FIG. 2 shows a schematic of a bearing for definition of tolerance classes for a bearing bore and a first bearing shell.

Therefore, it is desirable to minimize the dispersion of the bearing play, and adherence to a minimal bearing play must always be ensured. For this reason the individual components class 10, and the tolerance range value $T_3$ of the third tolerance class 11. Analogously thereto, the total tolerance t of the upper bearing shell 6 results from the sum of the tolerance range values $t_1$ of the first tolerance class 9, $t_2$ of the second first tolerance class 9, and $t_3$ of the third tolerance class 11.

The tolerance class sizes $T_i$ and $t_i$ (with i=1, 2, 3) indicate the size of the tolerance ranges 12, 13 and 14 for the bearing bore 2, and 15, 16, and 17 of the upper bearing shell 6. The resulting maximum and minimum values of quantity $M_1$ and the resulting dispersion of quantity $M_1$ are listed in the following table for tolerance classes 9, 10, and 11. Both the tolerance classes 9, 10, and 11 and also the values for any tolerance class i and for the tolerance class n are cited. For example, the minimum value of quantity $M_1$, designated as $M_{1,\,min,\,.2}$, which arises for the second tolerance class 10, is also defined by way of example. The dispersion of $M_1$ indicated in the table results from $M_{1,\,max}-M_{1,\,min}$.

| Tolerance class | $M_{1,\,max}$ | $M_{1,\,min}$ | Dispersion $M_1$ |
|---|---|---|---|
| 1 | $D + T_1 - LS$ | $D - LS - t_1$ | $T_1 + t_1$ |
| 2 | $D + T_1 + T_2 - LS - t_1$ | $D + T_1 - LS - t_1 - t_2$ | $T_2 + t_2$ |
| 3 | $D + T_1 + T_2 + T_3 - LS - t_1 - t_2$ | $D + T_1 + T_2 - LS - t_1 - t_2 - t_3$ | $T_3 + t_3$ |
| i | max. play$_{i-1}$ + $(T_i - t_{i-1})$ | max. play$_{i-1}$ + $(T_{i-1} - t_i)$ | $T_i + t_i$ |
| n | $D + T_1 + T_2 + \ldots + T_n - LS - t_1 - \ldots - t_{n-1}$ | $D + T_1 + \ldots + T_{n-1} - LS - t_1 - t_2 \ldots - t_n$ | $T_n + t_n$ | of the bearing 1, i.e., the bearing bore 2, the journal 4 and the upper and lower bearing shell 6 and 7, are divided into tolerance classes, for example, using measurement results. Using this division then components with tolerance classes which match one another can be assigned to one another. For example, it is provided that the tolerance of the bearing bore 2 be equalized by means of the upper bearing shell 6 and the tolerance of the journal 4 by means of the lower bearing shell 7. A method is described below in which for each tolerance class the same minimum and maximum bearing play is present, so that the tolerance classes are equivalent. Thus the dispersion of the bearing play in each tolerance class becomes minimal. Likewise, the largest allowed production tolerance will be determined for the maximally allowable magnitude of the dispersion of the bearing play.

Figure 3:
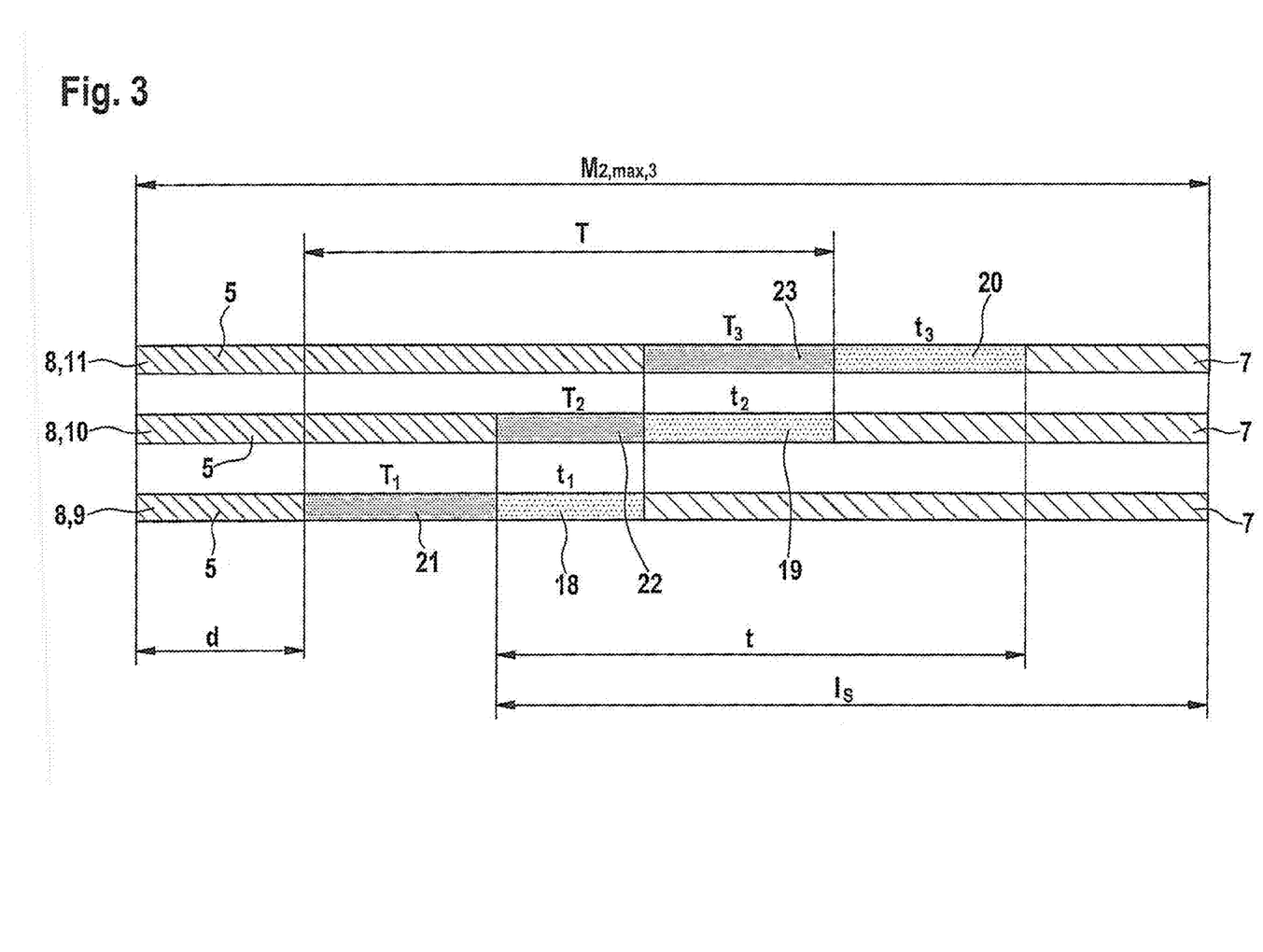
FIG. 3 shows a schematic of a bearing for definition of tolerance classes for a journal and another bearing shell.

FIG. 2 shows one schematic for definition of the tolerance class for the bearing bore 2 and the upper bearing shell 6. Bars FIG. 3 shows a schematic for definition of the tolerance classes for the journal 4 and the lower bearing shell 7. In turn, bars 8 are shown which stand for the first tolerance class 9, the second tolerance class 10 and the third tolerance class 11. The diameter d of the journal 4 and the thickness Is of the lower bearing shell 7 are also shown. The total tolerance t of the lower bearing shell 7 results from the sum of the tolerance range values $t_1$ of a first tolerance range 18, $t_2$ of a second tolerance range 10 and $t_3$ of a third tolerance range 20. Likewise the total tolerance T of the crankshaft 5 or of the journal 4 results from the tolerance range values $T_1$ of a first tolerance range 21, $T_2$ of a tolerance range 22 and $T_3$ of a tolerance range 23. The maximum value of quantity $M_2$ for the third tolerance class 11, designated as $M_{2,\,max,\,3}$ is shown by way of example. The following table lists the maximum and minimum values of quantity $M_2$ and the respective dispersion. The dispersion of $M_2$ results from $M_{2,\,max}-M_{2,\,min}$.

| Tolerance class | $M_{2,\,max}$ | $M_{2,\,min}$ | Dispersion $M_2$ |
|---|---|---|---|
| 1 | $d + T_1 - Is$ | $d - Is - t_1$ | $T_1 + t_1$ |
| 2 | $d + T_1 + T_2 - Is - t_1$ | $d + T_1 - Is - t_1 - t_2$ | $T_2 + t_2$ |
| 3 | $d + T_1 + T_2 + T_3 - Is - t_1 - t_2$ | $d + T_1 + T_2 - Is - t_1 - t_2 - t_3$ | $T_3 + t_3$ |
| i | max. play$_{i-1}$ + $(T_i - t_{i-1})$ | max. play$_{i-1}$ + $(T_{i-1} - t_i)$ | $T_i + t_i$ |
| n | $d + T_1 + T_2 + \ldots + T_n - Is - t_1 - \ldots - t_{n-1}$ | $d + T_1 + \ldots + T_{n-1} - Is - t_1 - t_2 \ldots - t_n$ | $T_n + t_n$ |

Figure 4:
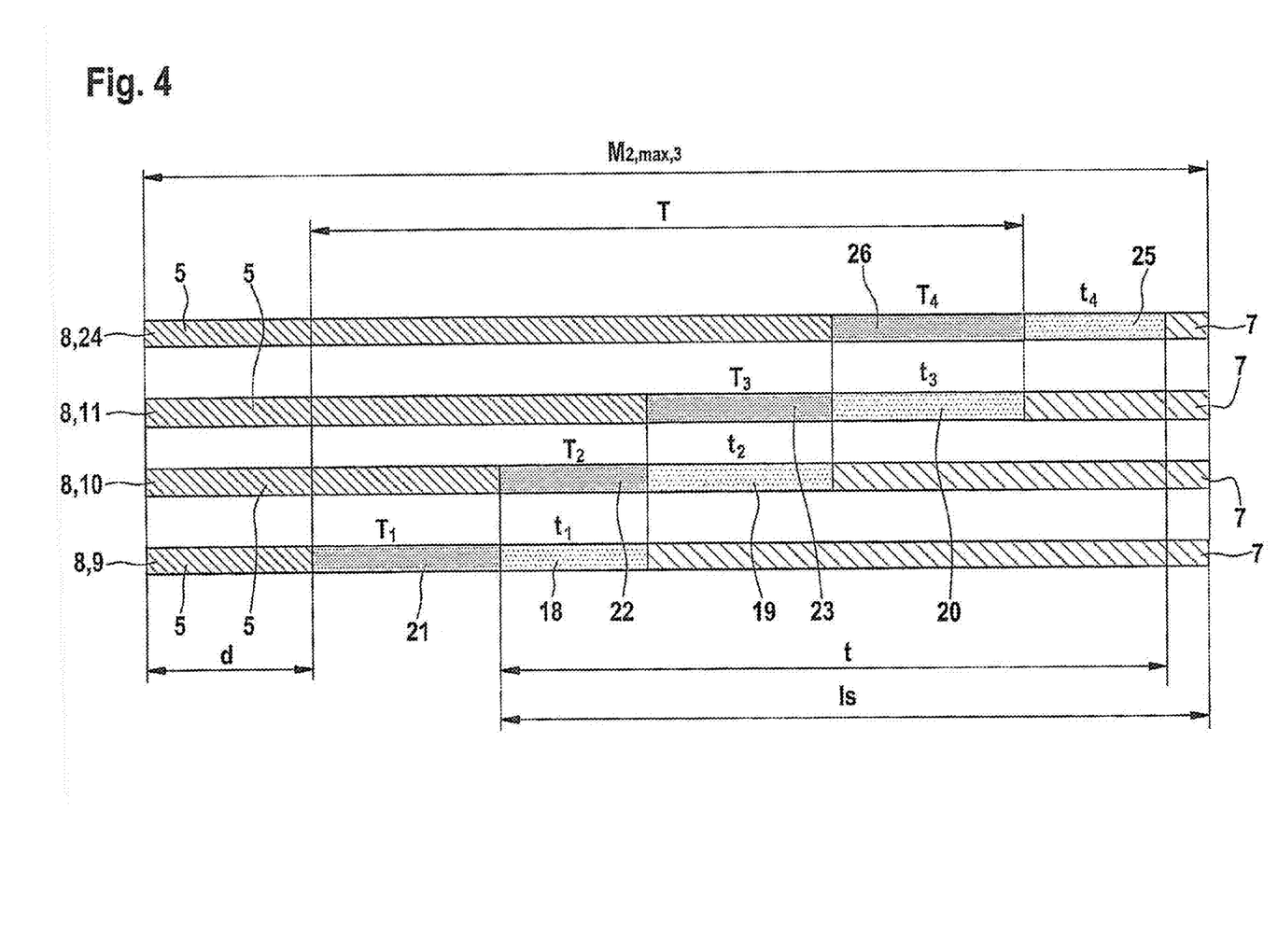
FIG. 4 shows a first application example for determining the dispersion of the bearing play.

8 shown in the horizontal plane represent a first tolerance class 9, a second tolerance class 10 and a third tolerance class 11. The diameters D of the bearing bore 2 and the thickness LS of the upper bearing shell 6 which are defined using FIG. 1 are also shown. The total tolerance T of the bearing bore 2 or of the cylinder crankcase 3 and tolerance t of the upper bearing shell 6 are likewise shown. The total tolerance T is composed of the tolerance range value $T_1$ of the first tolerance class 9, the tolerance range value $T_2$ of the second tolerance FIG. 4 shows a first example for determining the dispersion of the bearing play using the pairing of the journal 4 of the crankcase 5 and lower bearing shell 7. Tolerance classes are shown analogously to FIG. 3, in addition to the first tolerance class 9, the second tolerance class 10 and the third tolerance class 11 there being a fourth tolerance class 24. The tolerance range 25 has a tolerance range value $t_4$ and is assigned to the lower bearing shell 7 and the fourth tolerance class 24. The tolerance range 26 has a tolerance range value $T_4$ and can be assigned to the journal 4 of the crankshaft 6 and likewise the fourth tolerance class 24. The tolerance range values $T_1$, $T_2$, $T_3$ and $T_4$ have a value of 5 µm, while the tolerance range values $t_1$, $t_2$, $t_3$ and $t_4$ have a value of 4 µm. The values reproduced in the following table and the dispersion of quantity $M_2$ of 12 µm follow from these tolerance range values.

| Tolerance class | $M_{2, max}$ | $M_{2, min}$ | Dispersion $M_2$ |
|---|---|---|---|
| 1 | $d + t_1 + Is = 56.484$ µm | $d + Is - t_1 = 56.475$ µm | $T_1 + t_1 = 9$ µm |
| 2 | $d + T_1 + T_2 + Is - t_1 = 56.485$ µm | $d + T_1 + Is - t_1 - t_2 = 56.476$ µm | $T_2 + t_2 = 9$ µm |
| 3 | $d + T_1 + T_2 + T_3 + Is - t_1 - t_2 = 56.486$ µm | $d + T_1 + T_2 + Is - t_1 - t_2 - t_3 = 56.477$ µm | $T_3 + t_3 = 9$ µm |
| 4 | $d + T_1 + T_2 + T_3 + T_4 + Is - t_1 - t_2 - t_3 = 56.487$ µm | $d + T_1 + T_2 + T_3 + T_4 + Is - t_1 - t_2 - t_3 - t_4 = 56.478$ µm | $T_i + t_i = 9$ µm |
| absolute values | 56.487 µm | 56.475 µm | 56.487 µm − 56.475 µm = 12 µm |

This is not optimum, since the basic rule of the same bearing classification was not observed, although there is an odd number of tolerance classes. If conversely the tolerance range values $T_1$, $T_2$, $T_3$ and $T_4$ are increased to 5 µm, there is the same bearing classification with $C_1 = C_2$, it follows from the table below that the dispersion of quantity $M_2$ drops to 10 µm. Although the size of the tolerance ranges 21, 22, 23 and 26 was increased, a reduction of dispersion is thus possible.

| Tolerance class | $M_{2, max}$ | $M_{2, min}$ | Dispersion $M_2$ |
|---|---|---|---|
| 1 | $d + t_1 + Is = 56.487$ µm | $d + Is - t_1 = 56.477$ µm | $T_1 + t_1 = 10$ µm |
| 2 | $d + T_1 + T_2 + Is - t_1 = 56.487$ µm | $d + T_1 + Is - t_1 - t_2 = 56.477$ µm | $T_2 + t_2 = 10$ µm |
| 3 | $d + T_1 + T_2 + T_3 + Is - t_1 - t_2 = 56.487$ µm | $d + T_1 + T_2 + Is - t_1 - t_2 - t_3 = 56.477$ µm | $T_3 + t_3 = 10$ µm |
| 4 | $d + T_1 + T_2 + T_3 + T_4 + Is - t_1 - t_2 - t_3 = 56.487$ µm | $d + T_1 + T_2 + T_3 + T_4 + Is - t_1 - t_2 - t_3 - t_4 = 56.477$ µm | $T_i + t_i = 10$ µm |
| absolute values | 56.487 µm | 56.477 µm | 56.487 µm − 56.477 µm = 10 µm |

Figure 5:
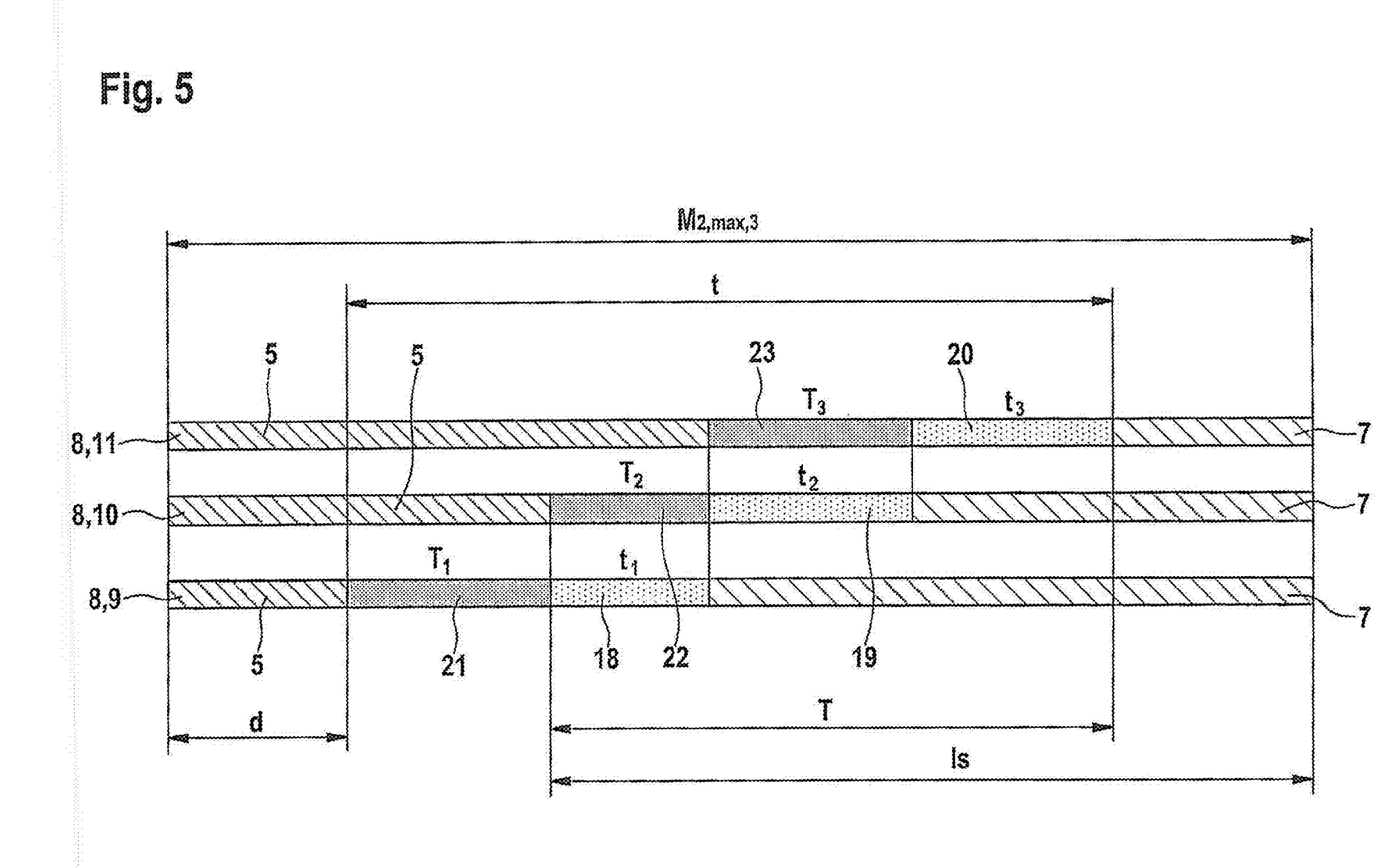
FIG. 5 shows a second example for determining the dispersion of the bearing play.

FIG. 5 shows a second example for determining the dispersion of the bearing play by means of three tolerance classes using the journal 4 and the lower bearing shell 7. Here the tolerance range values $T_1 = 6$ µm, $T_2 = T_3 = 7$ µm and $t_1 = t_2 = t_3 = 4$ µm. The dispersion of quantity $M_2$ of 16 µm follows from the table cited below.

| Tolerance class | $M_{2, max}$ | $M_{2, min}$ | Dispersion $M_2$ |
|---|---|---|---|
| 1 | $d + t_1 + Is = 60.475$ µm | $d + Is - t_1 = 60.465$ µm | $T_1 + t_1 = 10$ µm |
| 2 | $d + T_1 + T_2 + Is - t_1 = 60.478$ µm | $d + T_1 + Is - t_1 - t_2 = 60.467$ µm | $T_2 + t_2 = 11$ µm |
| 3 | $d + T_1 + T_2 + T_3 + Is - t_1 - t_2 = 60.481$ µm | $d + T_1 + T_2 + Is - t_1 - t_2 - t_3 = 60.470$ µm | $T_3 + t_3 = 11$ µm |
| absolute values | 60.481 µm | 60.465 µm | 60.481 µm − 60.465 µm = 16 µm |

This is in turn not optimum since there is an unlike number of tolerance classes and thus the unlike bearing classification can be used. If conversely $C_1=T_1=t_2=T_3=8$ μm and $C_2=t_1=T_2=t_3=4$ μm, the dispersion of quantity $M_2$ drops to 12 μm, as cited in the following table. This is achieved although almost all tolerance range values have been increased.

| Tolerance class | $M_{2,max}$ | $M_{2,min}$ | Dispersion $M_2$ |
|---|---|---|---|
| 1 | $d + t_1 + Is = 60.481$ μm | $d + Is - t_1 = 60.469$ μm | $T_1 + t_1 = 12$ μm |
| 2 | $d + T_1 + T_2 + Is - t_1 = 60.481$ μm | $d + T_1 + Is - t_1 - t_2 = 60.469$ μm | $T_2 + t_2 = 12$ μm |
| 3 | $d + T_1 + T_2 + T_3 + Is - t_1 - t_2 = 60.481$ μm | $d + T_1 + T_2 + Is - t_1 - t_2 - t_3 = 60.469$ μm | $T_3 + t_3 = 12$ μm |
| absolute values | 60.481 μm | 60.469 μm | 60.481 μm – 60.469 μm = 12 μm |

It is therefore possible to achieve a reduction of the dispersion of the bearing play with another distribution of the tolerance range values and/or an increase of the tolerance range values.

Figure 6:
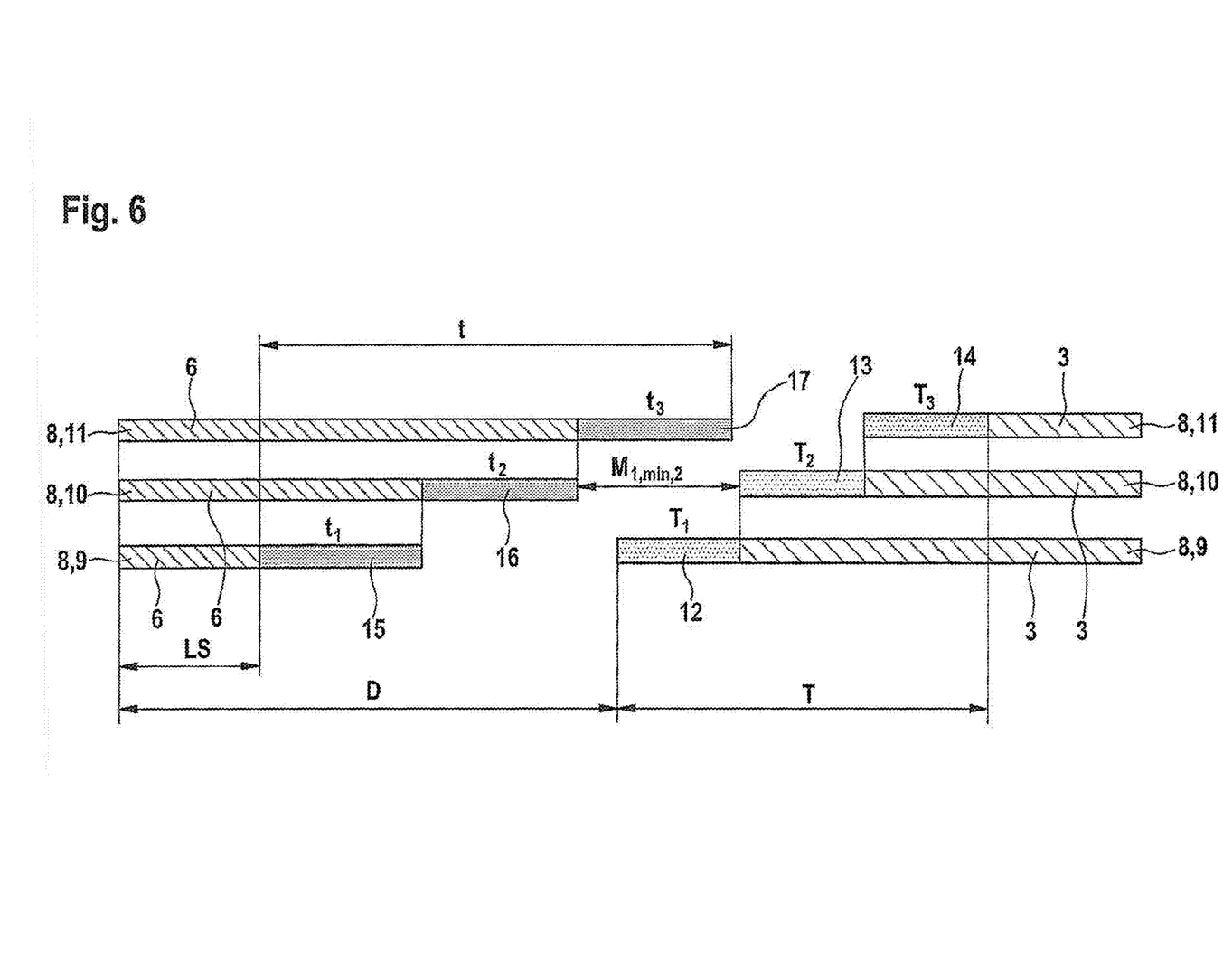
FIG. 6 shows a third example for determining the dispersion of the bearing play.

FIG. 6 shows another example for determination of the dispersion of the bearing play with three tolerance classes using the pairing of the bearing bore 2 or cylinder crankcase 3 and the upper bearing shell 6. The tolerance range values are specified with $t_1=t_2=t_3=5$ μm and $T_1=5$ μm and $T_2=T_3=7$ μm. The dispersion of quantity $M_1$ of 14 μm results from the following table.

| Tolerance class | $M_{1,max}$ | $M_{1,min}$ | Dispersion $M_1$ |
|---|---|---|---|
| 1 | $d + T_1 + LS = 67.503$ μm | $D + LS - t_1 = 67.493$ μm | $T_1 + t_1 = 10$ μm |
| 2 | $D + T_1 + T_2 + LS - t_1 = 67.505$ μm | $d + T_1 + LS - t_1 - t_2 = 67.493$ μm | $T_2 + t_2 = 12$ μm |
| 3 | $D + T_1 + T_2 + T_3 + LS - t_1 - t_2 = 67.507$ μm | $D + T_1 + T_2 + LS - t_1 - t_2 - t_3 = 67.495$ μm | $T_3 + t_3 = 12$ μm |
| absolute values | 67.507 μm | 67.493 μm | 67.507 μm – 67.493 μm = 14 μm |

This value can be further optimized since there is an odd tolerance class number, but condition $C_1=T_1=t_2=T_3$ and $C_2=t_1=T_2=t_3$ was not observed. If conversely $T_1=7$ μm and $T_2=5$ (correspondingly $t_2=7$ μm) are selected, i.e., the tolerance range values $T_1$ and $T_2$ are interchanged and the tolerance range value $t_2$ is increased, $C_1 > C_2$ applies and the dispersion of quantity $M_1$ can be reduced to 12 μm. This is cited in the following table.

| Tolerance class | $M_{1,max}$ | $M_{1,min}$ | Dispersion $M_1$ |
|---|---|---|---|
| 1 | $d + T_1 + LS = 67.505$ μm | $D + LS - t_1 = 67.493$ μm | $T_1 + t_1 = 12$ μm |
| 2 | $D + T_1 + T_2 + LS - t_1 = 67.505$ μm | $d + T_1 + LS - t_1 - t_2 = 67.493$ μm | $T_2 + t_2 = 12$ μm |
| 3 | $D + T_1 + T_2 + T_3 + LS - t_1 - t_2 = 67.505$ μm | $D + T_1 + T_2 + LS - t_1 - t_2 - t_3 = 67.493$ μm | $T_3 + t_3 = 12$ μm |
| absolute values | 67.505 μm | 67.493 μm | 67.505 μm – 67.493 μm = 12 μm |

It is therefore shown that by using the above described method the dispersion of the bearing play which results from quantities $M_1$ and $M_2$ can be clearly reduced, even if at the same time the total tolerances of the bearing bore 2, of the journal 4 and/or the upper and lower bearing shell 6 and 7 are increased.

Using the example of FIG. 6 it should also be detailed that when using an unlike bearing classification when the dispersion of the bearing play is specified, production tolerances of the bearing bore 2, of the journal 4 and of the upper and lower bearing shell 6 and 7 can be increased. If the tolerance range values $t_1=t_2=t_3=5$ μm and $T_1=5$ μm and $T_2=T_3=7$ μm are used, for a dispersion of the bearing play of 14 μm the total tolerance is $T=5$ μm$+7$ μm$+7$ μm$=19$ μm. This value can be optimized when using an unlike bearing classification. For this purpose the relation $T_1+T_2=14$ μm must be maintained, which results for example in $T_1=9$ μm and $T_2=5$ μm. This yields $T=T_1+T_2+T_3=9$ μm$+5$ μm$+9$ μm$=23$ μm. This corresponds to an increase of the production tolerance by 21%. Likewise, for example $T_1=10$ μm and $T_2=4$ μm can be selected so that $T=10$ μm$+4$ μm$+10$ μm$=24$ μm. Here even an increase of the production tolerance by 26% is achieved although the dispersion of the bearing play is the same as in the originally cited example. Here it must be watched that the quantity $T_2$ is generally dependent on the production technology of the bearing shells 6 and 7 and thus has a favorable minimum size which must be observed in order to achieve for example production costs as low as possible.

The invention claimed is:

1. A method comprising
assigning a plurality of bearing components to a plurality of tolerance classes,
wherein the plurality of bearing components comprise:
  a plurality of bearing bores,
  a plurality of journals,
  a plurality of upper bearing shells, and
  a plurality of lower bearing shells,
wherein a first value ($M_1$) is defined as a difference between a diameter of a bearing bore (D) and a thickness of a upper bearing shell (LS), when the bearing bore and the upper bearing shell are assigned to the same tolerance class,
wherein a second value ($M_2$) is defined as a sum of the diameter of a journal (d) and a thickness of a lower bearing shell (Is), when the journal and the lower bearing shell are assigned to the same tolerance class,
wherein a maximum value of the first value ($M_1$) is the same for all of the plurality of tolerance classes,
wherein a minimum value of the first value ($M_1$) is the same for all of the plurality of tolerance classes,
wherein a maximum value of the second value ($M_2$) is the same for all of the plurality of tolerance classes,
wherein a minimum value of the second value ($M_2$) is the same for all of the plurality of tolerance classes,
assembling a first component selected from the group consisting of a bearing bore, a journal, and combinations thereof together with a second component selected from the group consisting of an upper bearing shell, a lower bearing shell, and combinations thereof to form a bearing,
wherein the first component belongs a first tolerance class from the plurality of tolerance classes,
wherein the second component belongs to a second tolerance class from the plurality of tolerance classes, and
wherein the first tolerance class is different from the second tolerance class.

\* \* \* \* \*